United States Patent
Pudiyathanda et al.

(10) Patent No.: US 9,726,514 B2
(45) Date of Patent: Aug. 8, 2017

(54) NAVIGATION SYSTEM THAT DISPLAYS OTHER-VEHICLE INFORMATION

(71) Applicant: Delphi Technologies, Inc., Troy, MI (US)

(72) Inventors: Devaiah Aiappa Pudiyathanda, Bangalore (IN); Vijayalakshmi Kr, Bangalore (IN); Pramod Narayanan Kaniampal, Bangalore (IN); Scott D. Brandenburg, Kokomo (IN); Suresh K. Chengalva, Westfield (IN)

(73) Assignee: Delphi Technologies, Inc., Troy, MI (US)

( * ) Notice: Subject to any disclaimer, the term of this patent is extended or adjusted under 35 U.S.C. 154(b) by 118 days.

(21) Appl. No.: 14/744,128

(22) Filed: Jun. 19, 2015

(65) Prior Publication Data

US 2016/0370201 A1 Dec. 22, 2016

(51) Int. Cl.
*G01C 21/36* (2006.01)
*G08G 1/00* (2006.01)
*G08G 1/137* (2006.01)

(52) U.S. Cl.
CPC ......... *G01C 21/3667* (2013.01); *G08G 1/137* (2013.01); *G08G 1/22* (2013.01)

(58) Field of Classification Search
CPC .............. G01C 21/3667; G08G 1/22
See application file for complete search history.

(56) References Cited

U.S. PATENT DOCUMENTS

| 6,292,747 B1 | 9/2001 | Amro et al. |
|---|---|---|
| 7,733,244 B2 | 6/2010 | Asada |
| 2008/0154499 A1* | 6/2008 | Tanaka ................. G01C 21/362 701/431 |
| 2009/0024317 A1 | 1/2009 | Aase et al. |
| 2011/0040440 A1 | 2/2011 | de Oliveira et al. |
| 2013/0278441 A1 | 10/2013 | Rubin et al. |
| 2015/0066357 A1 | 3/2015 | Lu et al. |
| 2015/0120188 A1 | 4/2015 | Jung |

FOREIGN PATENT DOCUMENTS

| JP | 2004 078786 A | 3/2004 |
|---|---|---|
| JP | 2007 164328 A | 6/2007 |

* cited by examiner

*Primary Examiner* — Basil T Jos
(74) *Attorney, Agent, or Firm* — Lawrence D. Hazelton

(57) ABSTRACT

A navigation system suitable for installation in a host-vehicle includes a navigation-device, a display, and a receiver. The navigation-device is configured to determine a first-location of a host-vehicle. The display is configured to show navigation-information to an operator of the host-vehicle. The navigation-information indicates the first-location relative to a map. The receiver is configured to receive profile-information associated with an other-vehicle. The profile-information includes a second-location of the other-vehicle. The system indicates the second-location on the map.

10 Claims, 4 Drawing Sheets

NAVIGATION SYSTEM THAT DISPLAYS OTHER-VEHICLE INFORMATION

TECHNICAL FIELD OF INVENTION

This disclosure generally relates to a navigation system for a host-vehicle, and more particularly relates to a system that displays the location and/or other information about other-vehicles sharing the roadway with the host-vehicle.

BACKGROUND OF INVENTION

It is known to display navigation-information such as a shape or curvature of a roadway traveled by a host-vehicle, and up-coming cross-roads or turns available for travel by the host-vehicle. It is also known to present navigation information from a top-view or looking-down perspective view and with from an elevated-looking forward perspective view. While this limited navigation-information is helpful to an operator, known forms of navigation-information do not show some types of information that could further help the operator to safely operate the host-vehicle.

SUMMARY OF THE INVENTION

In accordance with one embodiment, a navigation system suitable for installation in a host-vehicle is provided. The system includes a navigation-device, a display, and a receiver. The navigation-device is configured to determine a first-location of a host-vehicle. The display is configured to show navigation-information to an operator of the host-vehicle. The navigation-information indicates the first-location relative to a map. The receiver is configured to receive profile-information associated with an other-vehicle. The profile-information includes a second-location of the other-vehicle. The system indicates the second-location on the map.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
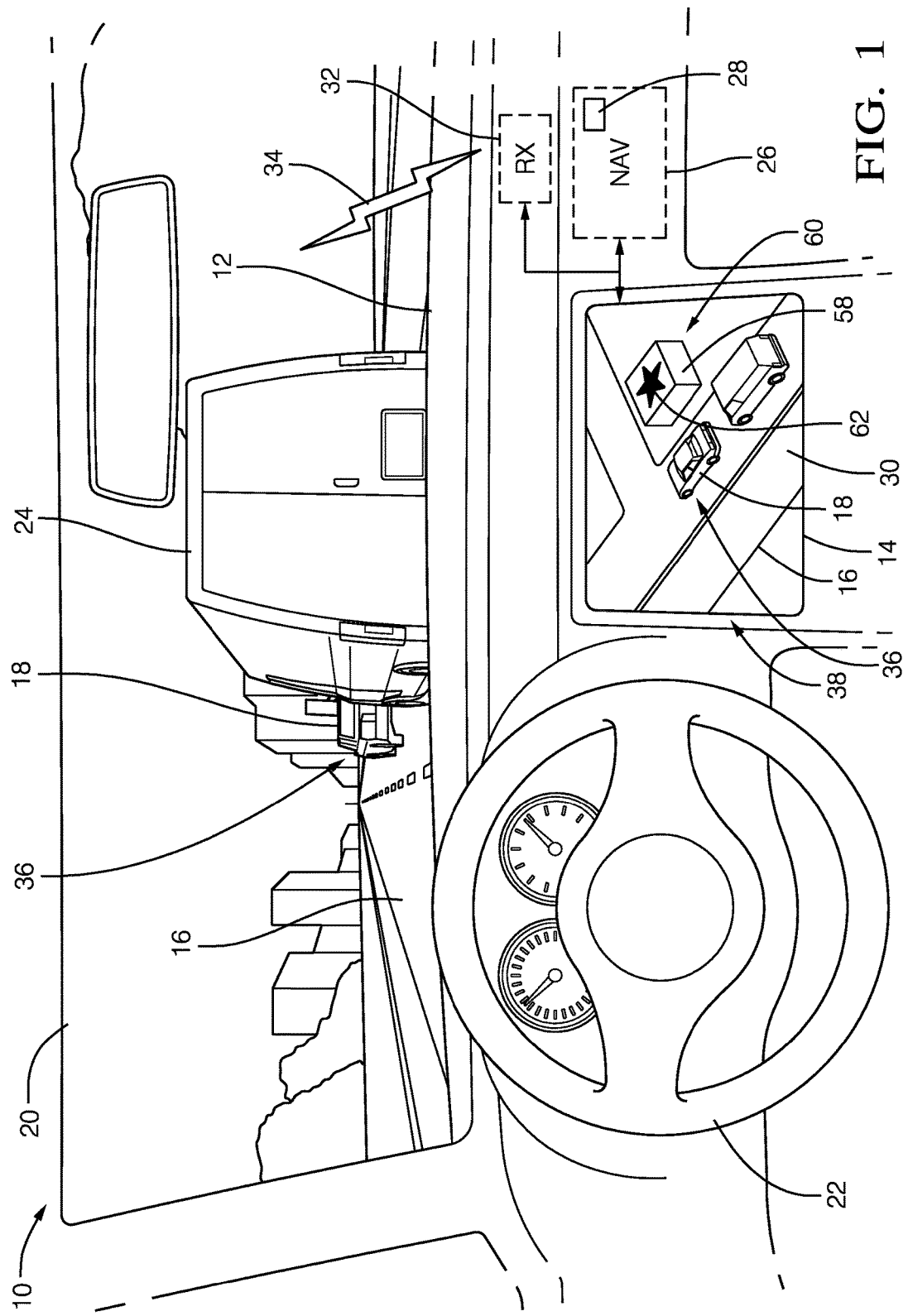
FIG. 1 is an illustration of an operator's view from an interior of a host-vehicle equipped with a navigation system in accordance with one embodiment.
Figure 2:
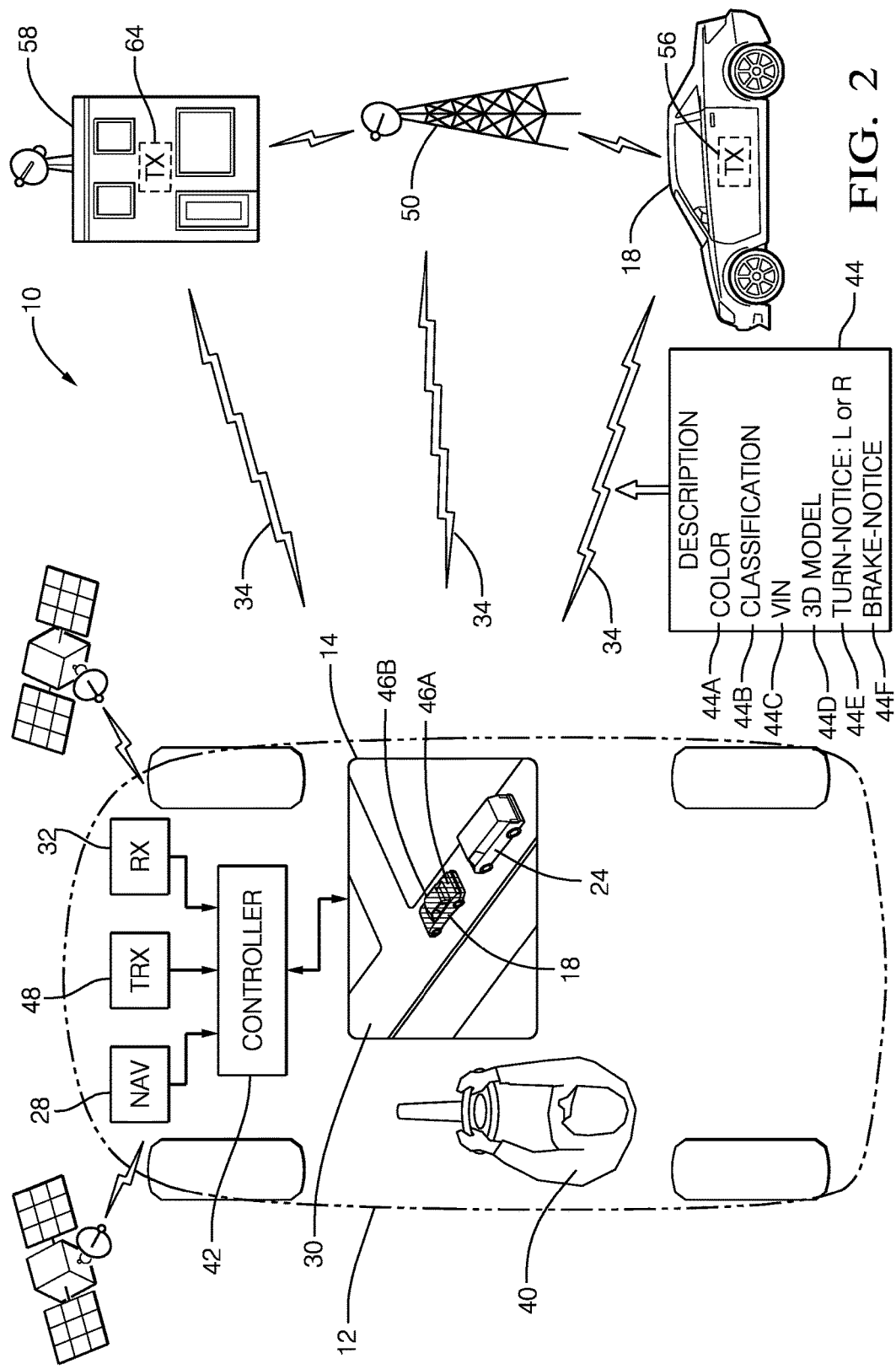
FIG. 2 is a diagram of the system of FIG. 1 in accordance with one embodiment.

FIG. 1 illustrates a non-limiting example of a navigation system 10, hereafter referred to as the system 10. The system 10 is shown installed in a host-vehicle 12 operated by an operator 40 (FIG. 2). The perspective illustrated in FIG. 1 is intended to correspond to that of the operator 40 seated in the host-vehicle 12. As will be explained in more detail below, the system 10 improves upon prior navigation systems in that the system 10 described herein shows on a display 14 a depiction of other vehicles sharing a roadway 16 with the host-vehicle 12. While the illustration suggests that the host-vehicle 12 is positioned in the middle of the roadway 16 so that the operator 40 has a view of an other-vehicle 18 through a windshield 20 of the host-vehicle 12, this is only for the purpose of simplifying the illustration and explanation. The advantages of the system 10 will be particularly apparent if a scenario is envisioned where the other-vehicle 18 is not viewable by the operator 40 while seated behind the steering wheel 22 because the host-vehicle 12 is directly behind a truck 24 which blocks the operator's view to the other-vehicle 18. If this scenario is envisioned, the advantages of having the other-vehicle 18 depicted on the display 14 will become apparent in the description of the system 10 that follows.

The system 10 includes a navigation-device 26 configured to determine a first-location 28 of a host-vehicle 12. The first-location 28 may be in terms of earth coordinates as part of a global-positioning-system (GPS) as will be recognized by those in the art. The system 10 also includes the display 14 which is configured to show the navigation-information 38 to the operator 40 of the host-vehicle 12. The navigation-device 26 may include memory (not shown) used to store a map 30, information needed so the navigation-information 38 can indicates the first-location 28 relative to a map 30. In this non-limiting example, the navigation-information 38 does not include a depiction of the host-vehicle 12 which is understood to correspond to a location just outside of the display 14-area of the display 14. Alternatively, a depiction of the host-vehicle 12 could be included on the display 14. The determination of whether or not the host-vehicle 12 is depicted on the display 14 may be selected by the operator 40 by altering a setting of the system 10, as will be recognized by those in the art.

The system 10 may also include a receiver 32 configured to receive profile-information 34 associated with an other-vehicle 18. By way of example and not limitation, the profile-information 34 may include a second-location 36 of the other-vehicle 18, which is distinct from the first-location 28 of the host-vehicle 12. The profile-information 34 can then be used by the system 10 to indicate the second-location 36 of the other-vehicle 18 on the map 30. That is, the system 10 can depict the location of the other-vehicle 18 on the map 30 relative to the host-vehicle 12. The profile-information 34 associated with the other-vehicle 18 may be provided to the system 10 by any of a variety of means including, but not limited to: by being broadcast by the other-vehicle 18 via radio-waves or infrared-light waves, by being gathered from traffic monitoring cameras (not shown), or gathered using a camera and broadcast by a vehicle that has a clear view of the other-vehicle 18, e.g. the truck 24.

FIG. 2 further illustrates non-limiting details of the system 10. The system 10 may include a controller 42 that receives information from the navigation-device 26 and the receiver 32. The controller 42 may include a processor (not shown) such as a microprocessor or other control circuitry such as analog and/or digital control circuitry including an application specific integrated circuit (ASIC) for processing data as should be evident to those in the art. The controller 42 may include memory (not shown), including non-volatile memory, such as electrically erasable programmable read-only memory (EEPROM) for storing one or more routines, thresholds and captured data. The one or more routines may be executed by the processor to perform steps to determine what should be shown on the display 14 as described herein.

The system 10 could be configured so every vehicle depicted on the display 14 was done using a generic icon such as a rectangle. However, it would be advantageous if the depiction of each vehicle shown on the display 14 corresponded in some manner to the actual vehicle being depicted. Accordingly, the profile-information 34 may include a description 44 of the other-vehicle 18. Accordingly, the system 10 may be configured to depict the other-vehicle 18 on the map 30 with a depiction that corresponds to the description 44.

By way of example and not limitation, the description 44 may include a vehicle-color 44A of the other-vehicle 18. It follows then that the depiction of the other-vehicle 18 on the display 14 may include the depiction being shown as having a depiction-color 46A that corresponds to the vehicle-color 44A. For example, if the other-vehicle 18 is yellow in color, the color used to depict the other-vehicle 18 on the display is preferable also shown as yellow. By depicting the various vehicles shown in the display 14 with a color that is the same or similar, i.e. corresponds to the actual color of each of the various vehicles, the operator 40 can more readily determine which depiction on the display 14 corresponds to an actual vehicle being viewed by the operator 40 through the windshield 20. Furthermore, if the operator 40 is not able to directly view a vehicle being depicted on the display 14, the fact that the color depicted on the display is not readily detected through the windshield may help the operator to identify where a vehicle hidden by the truck 24 may be located.

By way of further example, the profile-information 34, or more specifically the description 44, may include a vehicle-classification 44B of the other-vehicle 18. As used herein, the term vehicle-classification is used to describe the other-vehicle in broad terms that would be instantly recognizable by ordinary persons. For example, the vehicle-classification 44B may be selected from a list that includes, but is not limited to: a passenger car, a pick-up truck, a semi-trailer, and a motorcycle. Accordingly, the system 10 may be configured to depict the other-vehicle 18 using a depiction-shape 46B that corresponds to the vehicle-classification 44B. That is, if the vehicle-classification 44B is a motorcycle, then a motorcycle will be depicted or shown on the display.

By way of further example, the profile-information 34 may include a vehicle-identification-number, hereafter the VIN 44C, of the other-vehicle 18, so the depiction of the other vehicle shown on the display is based on the VIN 44C. Given the VIN 44C, the system 10 may consult a data-base stored in memory within or accessible by the controller 42. Alternatively, the system 10 may include a transceiver 48 configured to communicate with a communications-network 50 that has access to the internet and can provide a variety of information about the other-vehicle 18 based on the VIN such as brand, model, year of manufacture, color, etc.

Alternatively, or in addition to the above examples of what the description 44 may include, the profile-information 34 may include a three-dimensional model 44D, hereafter the 3D model 44D, of the other-vehicle 18. By directly communicating the 3D model 44D to the system 10, the system 10 can avoid having to, for example, search the internet via the communications-network 50, or maintain a data-base within the system 10. As will be recognized by those in the art, the 3D model may include the depiction-color 46A, the depiction-shape 46B, and other details about the physical description of the other-vehicle 18. For example, the other-vehicle 18 may be towing a trailer, and be configured to broadcast the profile-information 34 with a 3D model 44D that includes the trailer.

In addition to depicting the other-vehicle 18 on the display 14 in a manner that makes it easy for the operator 40 to reconcile what is shown on the display 14 with what the operator 40 when looking through the windshield 20, it may be advantageous if the system 10 provided some indication of action being taken by the other-vehicle 18. The advantage of this additional capability is especially valuable when the actual view from the operator 40 to the other-vehicle 18 is blocked by the truck 24.

Figure 3A:
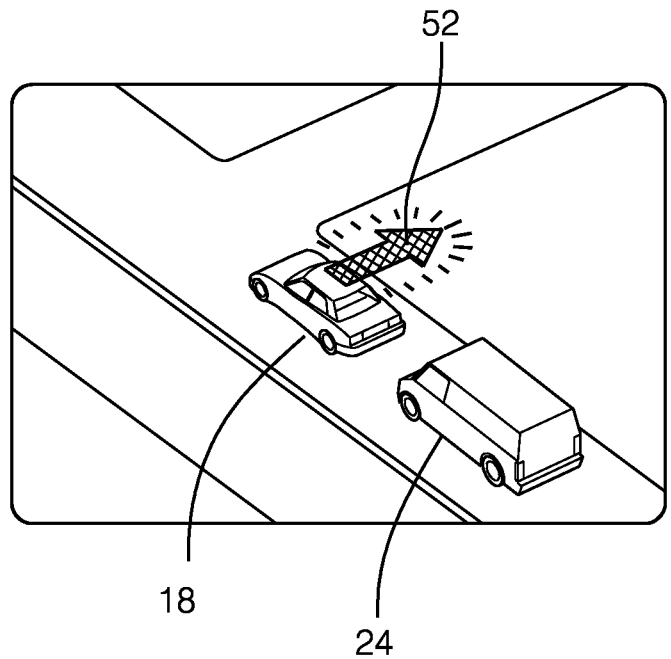
FIGS. 3A and 3B are examples of images displayed by the system of FIG. 1 in accordance with one embodiment.
Figure 3B:
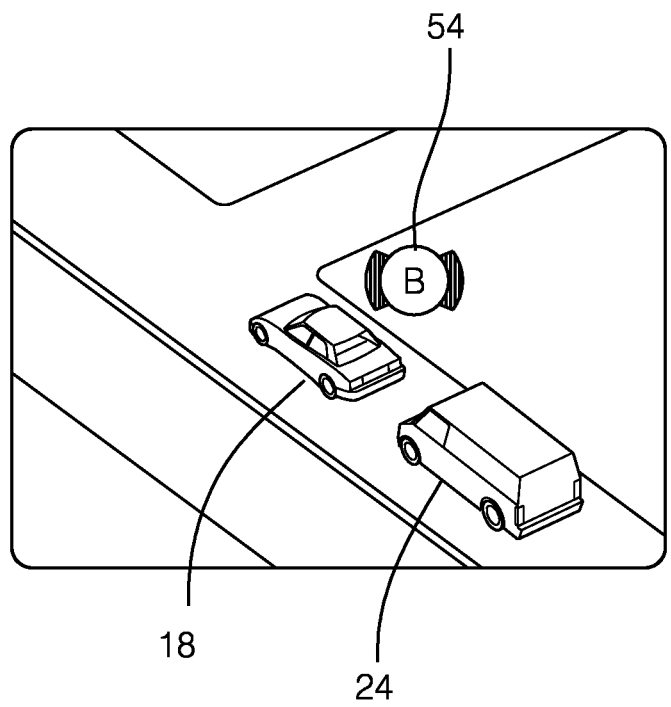

FIGS. 3A and 3B illustrate non-limiting examples of how an action being taken by the other-vehicle 18 might be depicted. If the operator of the other-vehicle 18 operates a turn-signal lever (not shown) within the other-vehicle 18, the profile-information 34 broadcast by the other-vehicle 18 may include a turn-notice 44E that indicates that the activation of a turn-signal by the other-vehicle 18. The turn-notice 44E would include an indication if a left-turn or a right-turn was being signaled. Accordingly, the system 10 may modify the image on the display 14 by overlying the depiction of the other-vehicle 18 with, for example, a flashing arrow 52 (FIG. 3A) that may be characterized has having a noticeable and/or contrasting color. By this, the system 10 displays a depiction that indicates that the turn-signal is activated in the other-vehicle 18. By displaying the flashing arrow 52 on the display, the operator 40 of the host-vehicle 12 may receive an advanced warning that the truck 24 is about to apply brakes, so the operator can pre-emptively slow down before the truck 24 begins braking.

By way of another example, the profile-information 34 may include a brake-notice 44F (FIG. 3B) indicative of activation of brakes by the other-vehicle 18, and the depiction of the other-vehicle 18 on the display 14 indicates that the brakes are activated. For example, the controller 42 may control the display 14 to show a brake-symbol 54 either adjacent to or overlying the depiction of the other-vehicle 18. As another alternative, the other-vehicle 18 may broadcast an indication that the other-vehicle 18 is in the reverse gear in preparation for backing the other-vehicle 18. Again, like the previous example, forewarning the operator 40 that a vehicle not viewable by the operator is applying brakes may help the operator to more safely control the host-vehicle 12.

Referring again to FIG. 2, the other-vehicle 18 may be equipped with a transmitter 56 configured to transmit the profile-information 34 of the other-vehicle 18. Transmission of the profile-information 34 by the other-vehicle 18 may be on a periodic basis, once every second for example. In addition, transmission of the profile-information 34 by the other-vehicle 18 may be event driven such as when a turn-signal is activated or the brakes are applied. Furthermore, transmission of the profile-information 34 by the other-vehicle 18 may be when the other-vehicle 18 enters the roadway 16 or makes a substantive change in vehicle speed.

If the profile-information 34 broad-cast by the other-vehicle 18 is intended for direct reception by the host-vehicle 12, the receiver 32 in the host-vehicle 12 may be configured to directly receive the profile-information 34 transmitted by the other-vehicle 18. Such direct communication is sometimes characterized as vehicle-to-vehicle (V2V) communication. Alternatively, the transmitter 56 in the other-vehicle 18 may be configured to transmit the profile-information 34 to the communications-network 50, and the receiver 32 in the host-vehicle 12 is configured to receive the profile-information 34 from the communications-network 50. Such communication is sometimes characterized as vehicle-to-network (V2X) communication.

In another embodiment of the system 10, the receiver 32 may be configured to receive profile-information 34 associated with a business 58. Advantageously, the profile-information 34 includes a third-location 60 of the business 58, and the navigation-information 38 indicates the third-location 60 on the map 30. Additionally, the profile-information 34 may include a logo 62 associated with the business 58, so the system 10 may be further configured to depict the logo 62 on the map 30. It is recognized that logos are often trademarked, so a star is used here as a generic logo rather than show a recognizable logo. To further assist the operator with identifying the actual build in which the business 58 resides, the profile-information 34 may include a description of a structure or building occupied by the business 58. For example, like the depiction of the other-vehicle 18, the depiction of the structure may include a building-color, a basic-shape, or a 3D model. Accordingly, the system 10 may be further configured to depict the structure on the map 30 with a depiction that corresponds to the description of the structure occupied by the business 58.

Like the other-vehicle 18, the business 58 may be equipped with a transmitter configured to transmit the profile-information 34 of the business 58. The receiver 32 in the host-vehicle 12 may be configured to directly receive the profile-information 34 transmitted by the business 58. Such communication is sometimes characterized as vehicle-to-infrastructure (V2I) communication. Alternatively, the transmitter 64 of the business 58 may be configured to transmit the profile-information 34 to a communications-network 50, and the receiver 32 in the host-vehicle 12 may be configured to receive the profile-information 34 from the communications-network 50, where such communication is characterized as vehicle-to-network (V2X) communication.

Figure 4:
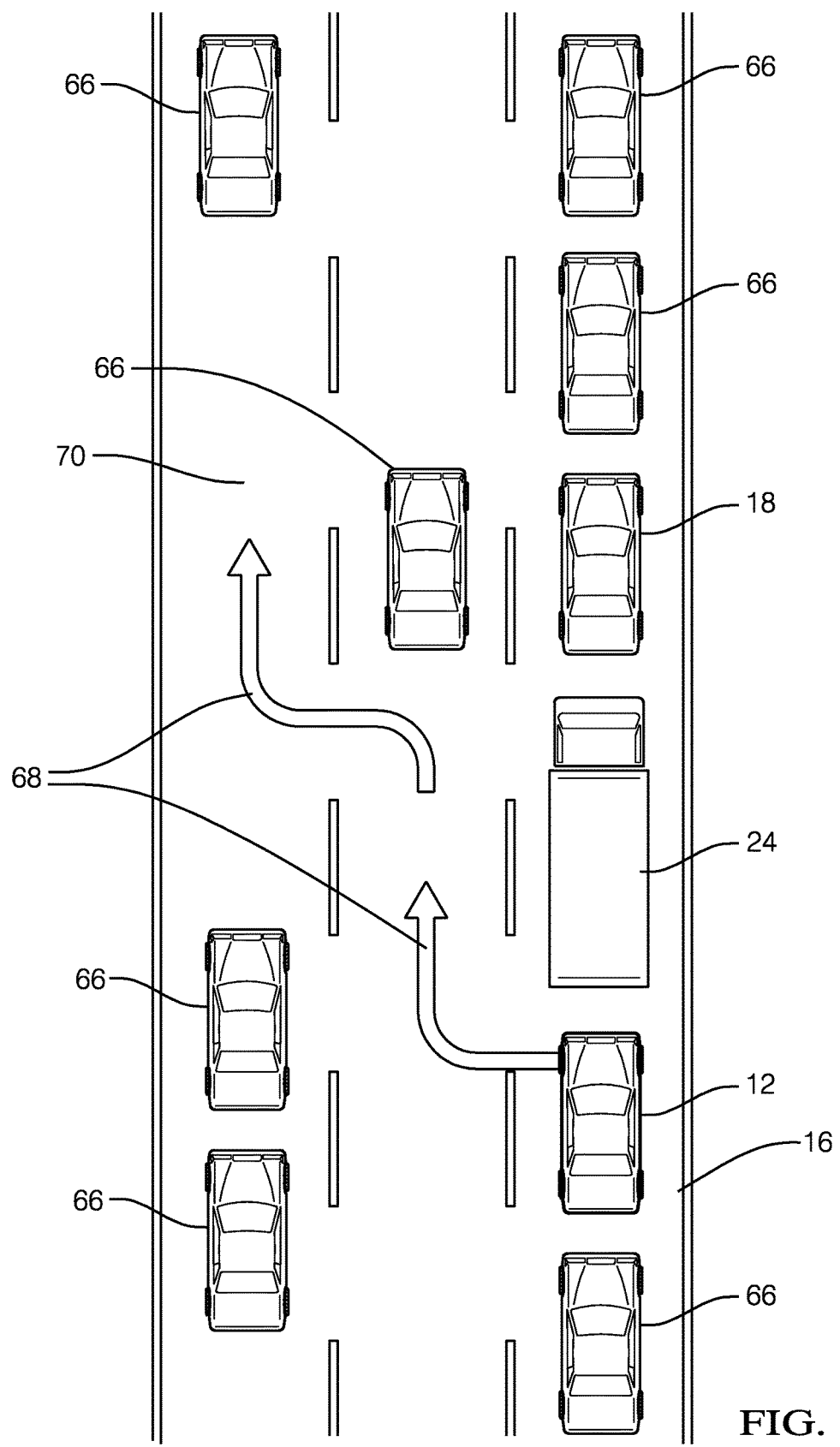
FIG. 4 is a traffic scenario experienced by the system of FIG. 1 in accordance with one embodiment.

FIG. 4 illustrates a non-limiting example of a traffic scenario where the host-vehicle 12, the truck 24, the other-vehicle 18, and additional-vehicles 66 occupy the roadway 16. The example scenario is a three-lane roadway where all of the vehicles are traveling in the same direction, and many of the vehicles in the right lane of the roadway 16 are planning to take an up-coming exit (not shown), except for the host-vehicle 12. The system 10 in the host-vehicle 12 has knowledge of the locations of all the vehicles illustrated and is configured to recognize that a route through the traffic indicated by the arrows 68 is available. Accordingly, the navigation-information 38 may include a suggested travel-lane 70 determined based on the profile-information 34 from all of the vehicles received by the system 10. The suggested travel-lane may be communicated to the operator 40 by displaying an arrow on the display 14 and/or emitting a voice instruction.

In another alternative embodiment, the profile-information 34 may include information for establishing a communication link from the host-vehicle 12 to the other-vehicle 18 so that a message (text or simulated voice) or simulated honk of a horn by the host-vehicle 12 could be transmitted to the other-vehicle 18, or a phone call could be made to the other-vehicle 18. It is recognized that the system 10 would need to be equipped with the necessary transceiver equipment to establish such a communication link.

Accordingly, a navigation system (the system 10) suitable for installation in a host-vehicle 12 is provided. The system 10 is an improvement over prior navigation systems because the system 10 displays to the operator 40 of the host-vehicle 12 the relative location of the other-vehicle 18, information about other vehicles to help the operator 40 determine which actual vehicle corresponds to a vehicle depicted on the display 14, and information about maneuvers being performed (e.g. braking) or about to be performed e.g. (turning). These features are especially advantageous when the operator 40 cannot see the other-vehicle 18 because the line-of-sight between the operator 40 and the other-vehicle 18 is blocked by, for example, the truck 24.

While this invention has been described in terms of the preferred embodiments thereof, it is not intended to be so limited, but rather only to the extent set forth in the claims that follow.

We claim:

1. A navigation system suitable for installation in a host-vehicle, said system comprising:
   a navigation-device configured to determine a first-location of a host-vehicle;
   a display configured to show navigation-information to an operator of the host-vehicle, wherein the navigation-information indicates the first-location relative to a map; and
   a receiver configured to receive profile-information associated with an other-vehicle, wherein the profile-information includes a second-location of the other-vehicle, and the system indicates the second-location on the map, wherein the profile-information includes a description of the other-vehicle, said system configured to depict the other-vehicle on the map with a depiction that corresponds to the description, wherein the description includes a vehicle-color of the other-vehicle, and the depiction is defined by a depiction-color that corresponds to the vehicle-color.

2. A navigation system suitable for installation in a host-vehicle, said system comprising:
   a navigation-device configured to determine a first-location of a host-vehicle;
   a display configured to show navigation-information to an operator of the host-vehicle, wherein the navigation-information indicates the first-location relative to a map; and
   a receiver configured to receive profile-information associated with an other-vehicle, wherein the profile-information includes a second-location of the other-vehicle, and the system indicates the second-location on the map, wherein the profile-information includes a vehicle-classification of the other-vehicle, and the depiction is defined by a depiction-shape that corresponds to the vehicle-classification, wherein the vehicle-classification is selected from a list that includes a passenger car, a pick-up truck, a semi-trailer, and a motorcycle.

3. A navigation system suitable for installation in a host-vehicle, said system comprising:
   a navigation-device configured to determine a first-location of a host-vehicle;
   a display configured to show navigation-information to an operator of the host-vehicle, wherein the navigation-information indicates the first-location relative to a map; and
   a receiver configured to receive profile-information associated with an other-vehicle, wherein the profile-information includes a second-location of the other-vehicle, and the system indicates the second-location on the map, wherein the profile-information includes a vehicle-identification-number (VIN) of the other-vehicle, and the depiction is based on the VIN.

4. A navigation system suitable for installation in a host-vehicle, said system comprising:

a navigation-device configured to determine a first-location of a host-vehicle;

a display configured to show navigation-information to an operator of the host-vehicle, wherein the navigation-information indicates the first-location relative to a map; and a receiver configured to receive profile-information associated with an other-vehicle, wherein the profile-information includes a second-location of the other-vehicle, and the system indicates the second-location on the map, wherein the profile-information includes a three-dimensional (3D) model of the other-vehicle.

5. A navigation system suitable for installation in a host-vehicle, said system comprising:

a navigation-device configured to determine a first-location of a host-vehicle;

a display configured to show navigation-information to an operator of the host-vehicle, wherein the navigation-information indicates the first-location relative to a map; and a receiver configured to receive profile-information associated with an other-vehicle, wherein the profile-information includes a second-location of the other-vehicle, and the system indicates the second-location on the map, wherein the profile-information includes a brake-notice indicative of activation of brakes by the other-vehicle, and the depiction indicates that the brakes are activated.

6. A navigation system suitable for installation in a host-vehicle, said system comprising:

a navigation-device configured to determine a first-location of a host-vehicle;

a display configured to show navigation-information to an operator of the host-vehicle, wherein the navigation-information indicates the first-location relative to a map; and a receiver configured to receive profile-information associated with an other-vehicle, wherein the profile-information includes a second-location of the other-vehicle, and the system indicates the second-location on the map, wherein the receiver is configured to receive profile-information associated with a business, wherein the profile-information includes a third-location of the business, and the navigation-information indicates the third-location on the map, wherein the profile-information includes a logo associated with the business, said system configured to depict the logo on the map.

7. A navigation system suitable for installation in a host-vehicle, said system comprising:

a navigation-device configured to determine a first-location of a host-vehicle;

a display configured to show navigation-information to an operator of the host-vehicle, wherein the navigation-information indicates the first-location relative to a map; and a receiver configured to receive profile-information associated with an other-vehicle, wherein the profile-information includes a second-location of the other-vehicle, and the system indicates the second-location on the map, wherein the receiver is configured to receive profile-information associated with a business, wherein the profile-information includes a third-location of the business, and the navigation-information indicates the third-location on the map, wherein the business is equipped with a transmitter configured to transmit the profile-information.

8. The system in accordance with claim 7, wherein the receiver in the host-vehicle is configured to directly receive the profile-information transmitted by the business, where such communication is characterized as vehicle-to-infrastructure (V2I) communication.

9. The system in accordance with claim 7, wherein the transmitter of the business configured to transmit the profile-information to a communications-network, and the receiver in the host-vehicle is configured to receive the profile-information from the communications network, where such communication is characterized as vehicle-to-network (V2X) communication.

10. A navigation system suitable for installation in a host-vehicle, said system comprising:

a navigation-device configured to determine a first-location of a host-vehicle;

a display configured to show navigation-information to an operator of the host-vehicle, wherein the navigation-information indicates the first-location relative to a map; and a receiver configured to receive profile-information associated with an other-vehicle, wherein the profile-information includes a second-location of the other-vehicle, and the system indicates the second-location on the map, wherein the navigation-information includes a suggested travel-lane determined based on the profile-information.

* * * * *